United States Patent [19]

Sato

[11] 4,423,812
[45] Jan. 3, 1984

[54] CASSETTE RECEPTACLE DEVICE

[75] Inventor: Masaaki Sato, Hachioji, Japan

[73] Assignee: Olympus Optical Company Limited, Tokyo, Japan

[21] Appl. No.: 302,374

[22] Filed: Sep. 15, 1981

[30] Foreign Application Priority Data

Sep. 18, 1980 [JP] Japan ................................. 55-130429

[51] Int. Cl.³ .......................................... B65D 85/672
[52] U.S. Cl. ..................................... 206/387; 220/23; 296/37.8; 296/37.12
[58] Field of Search ................... 296/37.1, 37.8, 37.12, 296/37.14; 224/42.42; 220/408, 410, 23; 206/387

[56] References Cited

U.S. PATENT DOCUMENTS 2,789,861  4/1957  Hudson .......................... 296/37.12
3,791,547  2/1974  Branscum .......................... 220/408
4,283,083  8/1981  Johnson ............................ 296/37.1

Primary Examiner—Robert R. Song
Attorney, Agent, or Firm—Toren, McGeady and Stanger

[57] ABSTRACT

A combined cassette receptacle and article storage device for a motor vehicle including an article storage compartment having an open side, a lid mounted to said compartment for opening and closing said open side, and a cassette receptacle member interposed between the lid and the compartment with a hinge mechanism pivotally mounting both the lid and the cassette receptacle for pivotal movement relative to the storage compartment. A locking or latch mechanism enables the lid to be raised independently of the cassette receptacle member to enable access to cassettes stored in the cassette receptacle member, with the latch mechanism also enabling both the lid and the cassette receptacle member to be pivoted simultaneously to open the article storage compartment.

5 Claims, 10 Drawing Figures

CASSETTE RECEPTACLE DEVICE

The present invention relates generally to storage device for automotive vehicles and more particularly to a cassette storage device which is incorporated with an article storage compartment in a vehicle.

As a result of the recent oil crisis, serious problems regarding fuel economy have occurred and automotive manufacturers have been forced to produce smaller and lighter vehicles. As a result, space within the vehicle becomes limited thereby increasing the difficulties of providing in the vehicle additional accessories such as in-car television and in-car telephone or safety mechanisms. This gives rise to disadvantages particularly in view of the higher safety standards which exist and the numerous new electronic devices made available by technological innovation. Accordingly, the space or cubby in an automobile where a console box may be located between the front seats or where a glove box may be located in the dashboard area becomes very important as a container for valuable belongings.

Furthermore, in recent years, audio devices have been more prevalent in automobiles and in particular there have come into use with automotive stereo systems tape cassettes which may be played in such stereo systems. As a result, it becomes necessary to store in the vehicle a number of tape cassettes so that they will be available for playing during use of the vehicle. Such tape cassettes will occupy a substantial amount of space in the console box or glove box so that it can become inconvenient to accommodate the necessary storage of other articles. If the tape cassettes cannot be accommodated in an orderly manner in the console box, it requires time to locate and obtain a desired tape cassette thereby causing inattentive driving which can be dangerous. Moreover, if a tape cassette is selected hurriedly, the tape cassette may become caught in the lid member of the console box so that the lid will not be able to be closed and there occurs the possibility of damage to the tape cassette.

Additionally, tape cassettes are usually stored in a separate casing for each cassette so that, before the tape cassette can be played, it must be removed from the casing. This removal and replacement of the tape cassette from the casing requires excessive time and, if performed during driving of a motor vehicle, may result in dangerous circumstances. If the tape cassette is not stored in the casing, then dust or other deleterious material may adhere to the magnetic tape or the winding of the tape may become loose with vibration so that the operability of the magnetic tape may be significantly impaired.

Accordingly, it is an object of the invention to overcome the aforementioned disadvantages of conventional cassette receptacle devices.

A further object is to provide a cassette receptacle device which is capable of accommodating tape cassettes in an orderly manner by combining the lid member of an article storage device in a motor vehicle, such as a console box or glove box, with a cassette receptacle member thereby to conserve space and to enable tape cassettes to be selected for playing and stored with great facility without requiring that the cassette be kept in a separate casing or storage box.

SUMMARY OF THE INVENTION

In accordance with the present invention, there is provided a cassette receptacle device for use in a motor vehicle wherein a combined cassette receptacle and article storage device may be provided in a cubby or other limited space of the vehicle with the combined device including a lid for an article storage compartment and a cassette receptacle member for conveniently storing cassettes therein. The cassette receptacle member is formed with a plurality of recesses each capable of accommodating a tape cassette laid flat or on its side. The recesses in the cassette receptacle member will receive the tape cassette itself without requiring that a casing for the cassette be used. The cassette receptacle member is formed essentially to comprise an inner lid of a console box or of a glove compartment box, which inner lid may operate in cooperation with an outer lid of the glove or console box or other article storage device so as to enable the article storage device to be opened for access to articles stored therein with the outer lid being movable separately from the cassette receptacle member to enable access to cassettes stored therein.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 5b is a sectional view of the member shown in FIG. 5a;

DESCRIPTION OF THE PREFERRED EMBODIMENTS

Figure 1:
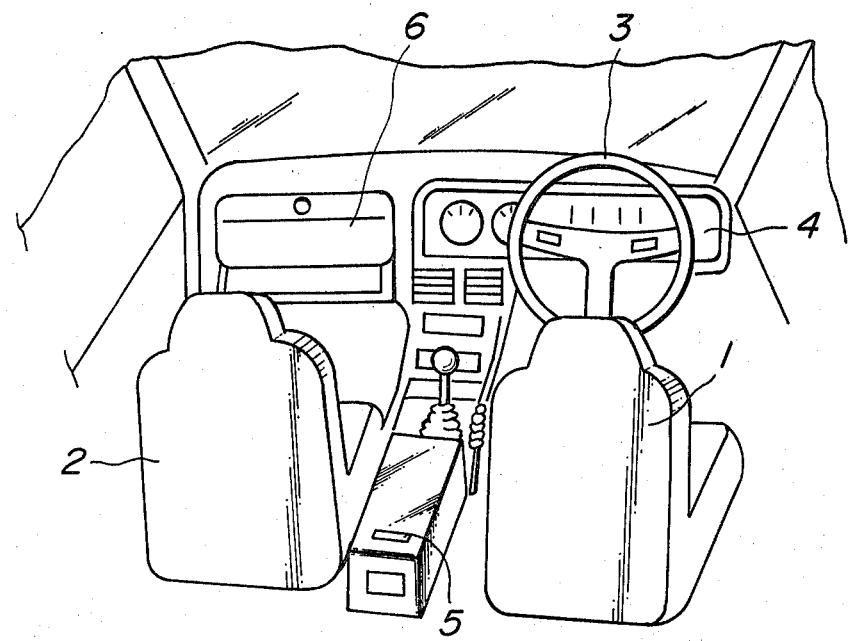
FIG. 1 is a perspective diagrammatic view of the front passenger compartment of a motor vehicle as seen from the rear thereof.

Referring now to the drawings, there is shown in FIG. 1 a rear view of a front passenger compartment of a motor vehicle wherein a device in accordance with the present invention may be utilized. The device of the invention may be utilized either in a cubby or space between the seats thereby forming a console box for the motor vehicle or it may be utilized as a glove compartment mounted in the dashboard of a motor vehicle. In FIG. 1, the front passenger compartment of the vehicle is shown as comprising a driver's seat 1, a passenger seat 2, a steering wheel 3, and an instrument panel or dashboard 4. The vehicle shown in FIG. 1 also includes a console box 5 and a glove box 6 and, as will be described hereinafter, the present invention may be utilized either in connection with the console box 5 or the glove box 6, or both.

Figure 2:
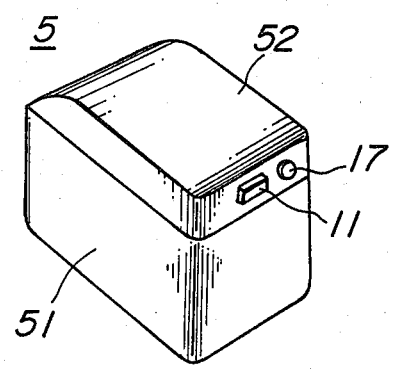
FIG. 2 is a perspective view of the exterior of a combined cassette receptacle and article storage device in accordance with the present invention particularly suitable for use as a console box in a motor vehicle.

A first embodiment of the invention shown in FIGS. 2-5b is constructed for use as the console box of the motor vehicle to be located between the front seats thereof. As shown in FIG. 2, the console box 5 comprises a box body 51 and an outer lid member 52. As shown in FIG. 3a, the box body 51 is formed with an inner hollow compartment having an upper open side which may act as an article storage compartment for the device. The upper open side of the box 51 is covered by the lid member 52 which is pivotally mounted on the box 51 by hinges 71 and 72.

Figure 3A:
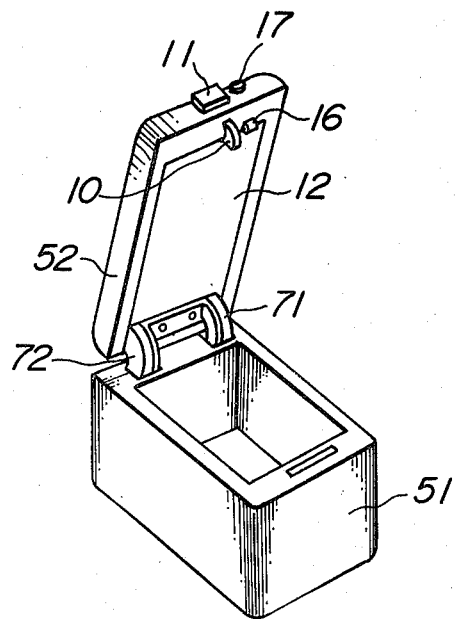
FIG. 3a is a perspective view showing the device of FIG. 2 with the lid assembly open so as to permit access to the article storage compartment thereof.

The lid assembly of the console box 5, as shown in FIG. 3a, is also formed with an inner lid 12 and in the position shown in FIG. 3a, both the outer lid member 52 and the inner lid member 12 are pivotally raised to provide access to the article storage compartment defined within the box 51.

Figure 3B:
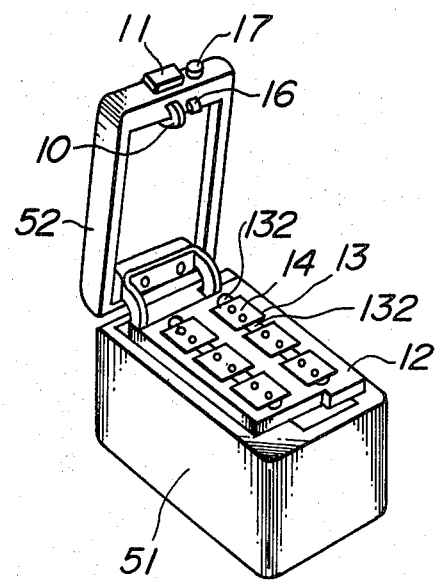
FIG. 3b is a perspective view showing the device with the outer lid open to permit access to tape cassettes stored in a cassette receptacle member.

The operation of the assembly of the invention whereby the inner lid member is permitted to remain in the lowered position so as to enable access to cassettes stored therein with the outer lid member 52 being retained in the raised position, is shown in FIG. 3b and will be discussed more fully hereinafter.

Figure 4A:
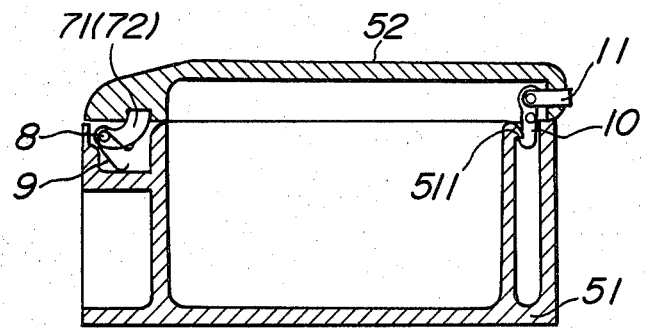
FIG. 4a is a sectional view illustrating the pivot assembly and latch mechanism for the outer lid member.

In FIG. 4a, the lid member is shown as provided with a spring 9 located at a center axis of rotation 8 of the hinges 71 and 72 so that the lid member 52 is biased to move in the upward or opening direction under the force of the spring 9. The assembly of the invention is also provided with a locking or latching mechanism which includes a claw member 511 formed in the box body 51 and a hook 10 attached to the outer lid member 52 whereby the lid member 52 is kept in the closed condition shown in FIG. 4a by interengagement between the hook 10 and the claw 511. This locked condition may be released by depression of a push button 11 which acts to actuate the hook 10 to move it out of engagement with the claw 511 thereby permitting the lid member 52 to be urged to the open or raised position by the force of the spring 9. This condition of the device is shown in FIG. 3a.

Figure 4B:
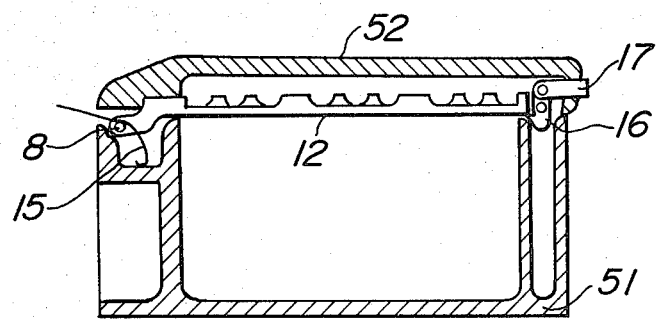
FIG. 4b is a sectional view illustrating the pivot assembly and latch mechanism for the combined outer lid and cassette receptacle member.
Figure 5A:
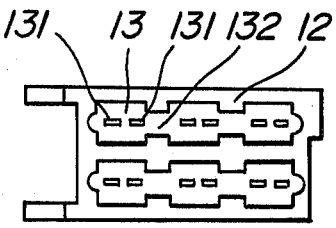
FIG. 5a is a plan view illustrating the cassette receptacle member of the invention which is adaptable for operation as the inner lid of the console box shown in FIG. 3b.
Figure 5B:
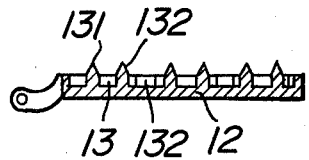

As shown in FIGS. 3b and 4b, the box body 51 is provided with the inner lid 12 which may be closed and opened independently of the lid member 52 or together therewith. The inner lid 12 is formed as a cassette receptacle member and may be constructed of plastic material. As shown in FIGS. 5a and 5b, the inner lid or cassette receptacle member 12 is provided with two rows of recesses 13 within which tape cassettes may be individually accommodated. In the embodiment shown, six recesses are provided and they are arranged so that the cassettes may be accommodated flat or on their sides. Each recess is provided with a pair of stopper members 131 adapted to engage within the hubs of the tape cassette to prevent rotation of the tape hubs. Additionally, a space 132 is provided between the recesses 13 to enable insertion therein of the fingers of a driver when a tape cassette is to be retrieved from within a recess 13 in the tape receptacle member 12. Each recess 13 is adapted to receive a tape cassette 14 which is the cassette itself without a casing or other separate tape cassette enclosure which is not necessary when a device in accordance with the present invention is utilized. As shown in FIG. 4b, the inner lid or tape receptacle member 12 is supported at the center axis of rotation 8 which is a common axis of rotation as that of the lid member 52 and the member 12 may be pivoted independently of the lid member 52. The member 12 is spring biased by a spring 15 for movement toward the closed or lowered position and it is locked in this position by a hook 16 provided in the lid member 52.

In the operation of the device structured as described above, when it is desired to raise both the outer lid member 52 and the inner lid or cassette receptacle member 12 simultaneously in order to permit access to the storage compartment in the box 51, the push button 11 is depressed. When this occurs, the hook 10 is released from locking engagement with the claw 511 of the box 51 so that the lid member 52 may be raised and opened by operation of the spring 9 as shown in FIG. 3a. In this case, the inner lid 12 remains locked with the lid member 52 by operation of the hook 16 since the push button 17 has not been depressed so that both the lid 52 and the lid or cassette receptacle member 12 will be raised together.

With the device in the condition shown in FIG. 3a, the inner compartment of the box 51 is exposed so that articles may be inserted and removed therefrom.

When it is desired to have access to tape cassettes, then the push button 11 is depressed and the push button 17 is also depressed. Locking of the hook 10 is released by depression of the push button 11 thereby to enable opening of the lid member 52. In this case, the locking of the hook 16 is also released by depression of the push button 17 so that the inner lid member 12 remains in the lower position overlying the open side of the box 51 held in this position by the spring 15 independently of the lid member 52. This condition of the assembly is shown in FIG. 3b.

Under such conditions, the inner lid or tape receptacle member 12 having the tape cassettes 14 therein is exposed so that a desired tape cassette 14 may be removed or inserted.

In accordance with the construction of the cassette receptacle device of the invention, a tape cassette may be accommodated by utilizing the lid member of a console box so that the space in a motor vehicle may be economically utilized so that belongings may be adequately accommodated in a console box. The tape cassettes may be accommodated in an orderly fashion and the cassette receptacle member may be easily accessible merely by depression of a button so that a desired tape cassette may be readily sought and obtained or replaced in its storage member. This may be accomplished without adversely affecting driving conditions. Moreover, the tape cassette itself is accommodated in a protected manner without requiring a casing so that further troublesome removal operations which may be required when a cassette must be removed from its casing are avoided.

As indicated, the foregoing description relates to an embodiment of the invention wherein the combined cassette receptacle and article storage device is utilized as a console box 5 in a motor vehicle located between the front seats of the vehicle. However, an embodiment wherein the invention is utilized as a glove box 6 located in the dashboard 4 of a motor vehicle is shown in FIGS. 6a and 6b.

Figure 6A:
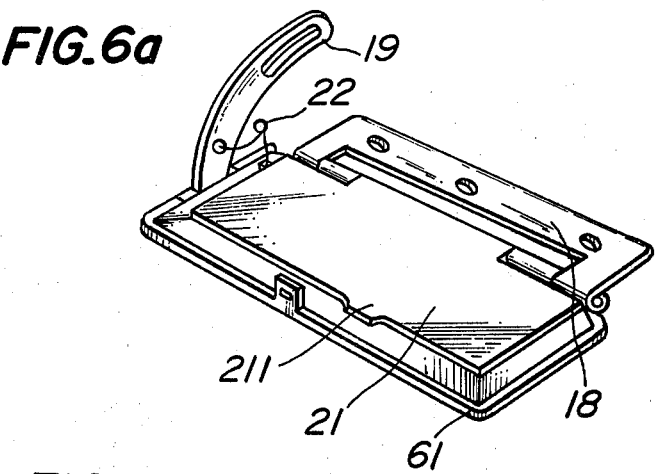
FIG. 6a is a perspective view of another embodiment of the invention illustrating the invention as adapted for use in a dashboard glove compartment storage device, with the lid shown in the open position to enable access to an article storage device or compartment.
Figure 6B:
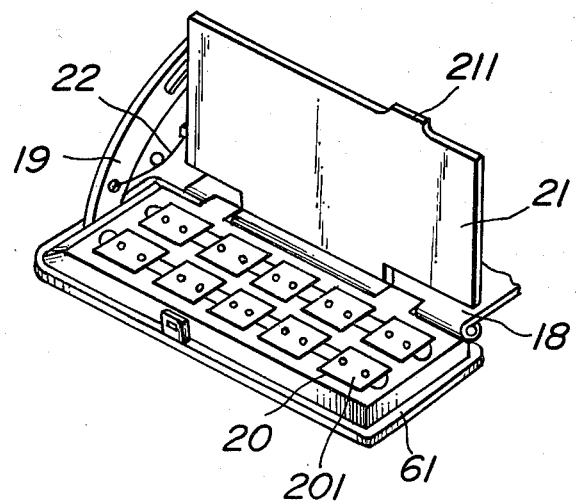
FIG. 6b is a perspective view of the device of FIG. 6a shown with the inner lid opened to permit access to cassettes stored in the cassette receptacle member.

Referring now to FIGS. 6a and 6b, the device thereof is shown as comprising a lid member 61 which is formed as the outer lid of the glove box 6 adapted to open and close the open side of a box body and mounted thereto by a hinge 18 with a guide arm 19. The lid member 61 is formed, for example, of plastic material and is provided at the inner side thereof with a plurality of recesses arranged in rows, capable of accommodating tape cassettes therein. In the embodiment shown in FIGS. 6a and 6b, ten recesses 20 are provided and each recess 20 is adapted to receive a tape cassette 201 without requiring use of a separate cassette casing. This condition is shown in FIG. 6b. The hinge 18 is provided with a keep plate 21 which may be rotated independently of the lid member 61. The keep plate 21 operates to prevent tape cassettes 201 accommodated on the inner side of the lid member 61 from accidentally being dislodged therefrom. The position wherein the keep plate 21 covers the recesses of the cassette storage member is shown in FIG. 6a, and the keep plate 21 may be raised to enable access to the tape cassettes as shown in FIG. 6b. The keep plate 21 is provided with a projection 211 by which the plate 21 may be opened and closed. In this embodiment, the lid member 61 is opened and closed by a push button (not shown) which is depressed when it is desired to open the lid 61 to enable access to the glove compartment 6. With the lid 61 in the open position shown in FIG. 6a, and with the keep plate 21 also in the lowered position shown in FIG. 6a, access may be had to the article storage device of the glove box 6. However, when it is desired to have access to the tape cassettes 201 in the recesses 20, it is merely necessary to grasp the projection 211 and raise the keep plate 21.

The construction described above of the cassette receptacle device is in effect essentially similar to that previously described in connection with the embodiment of FIGS. 2-5b.

From the foregoing, it will be seen that the present invention provides several distinct advantages in that easy access to tape cassettes is permitted while enabling economical use of storage space in a motor vehicle.

While specific embodiments of the invention have been shown and described in detail to illustrate the application of the inventive principles, it will be understood that the invention may be embodied otherwise without departing from such principles.

I claim:

1. A combined cassette receptacle and article storage device for a motor vehicle comprising:
   means defining an article storage compartment generally formed with a box-like configuration having an open side through which articles may be inserted and removed from said compartment;
   a lid mounted to said compartment for opening and closing of said open side thereof;
   a cassette receptacle member mounted on said article storage compartment for cooperation with said lid and adapted to releasably hold therein a plurality of tape cassettes;
   hinge means pivotally mounting said lid to said compartment for pivotal movement between an open and a closed position relative to said open side and also pivotally mounting said cassette receptacle member for pivotal motion relative to both said article storage compartment and said lid, said hinge means being structured to mount both said lid and said receptacle member for pivotal movement about a common axis;
   recessed means defining on said cassette receptacle member a plurality of recesses shaped to receive therein in fitted engagement tape cassettes, said recesses being located on a side of said receptacle member facing toward said lid; and
   latch means operatively interposed between said article storage compartment and both said lid and said cassette receptacle member, said latch means being operative to latch said lid and said receptacle member together for pivotal motion jointly about said common axis to enable access to said storage compartment and to release said latching engagement to permit pivoted motion about said common axis of said lid alone to enable access to said recesses on said cassette receptacle member.

2. A device according to claim 1 further comprising spring means biasing said cassette receptacle member toward a closed position overlying said open side of said article storage compartment.

3. A device according to claim 2 comprising further spring means spring biasing said lid toward the open position thereof.

4. A device according to claim 1 wherein said latch means comprise a first latch releasably engaging said lid member with said article storage compartment and a second latch releasably engaging said lid member with said cassette receptacle member, said first and second latch each including, respectively, a first and second release button operable to release said engagement thereof.

5. A combined cassette receptacle and article storage device for a motor vehicle comprising:
   means defining an article storage compartment generally formed with a box-like configuration having an open side through which articles may be inserted and removed from said compartment;
   an outer lid mounted to said compartment for opening and closing said open side thereof;
   recessed means defining on the inner side of said outer lid a plurality of recesses operating as cassette receptacle recesses forming said outer lid as a cassette receptacle member;
   a keep plate pivotally mounted between said outer lid and said article storage compartment, said keep plate being adapted to be pivoted with said outer lid to open said article storage compartment and to be pivoted relative to said outer lid to permit access to said recesses;
   hinge means pivotally mounting said outer lid and said keep plate relative to said storage compartment for pivotal movement simultaneously between an opened and a closed position relative to said open side, said hinge means being arranged to form a common axis of rotation for both said outer lid and said keep plate; and latch means operatively interposed between said article storage compartment and both said keep plate and said outer lid, said latch means being operable to latch said outer lid in closed engagement with said article storage compartment and to permit both said outer lid and said keep plate to be pivoted simultaneously to open said storage compartment, said keep plate being pivotally mounted relative to both said storage compartment and said outer lid to enable pivotal motion thereof relative to said outer lid to permit access to tape cassettes in said recesses.

* * * * *